(12) United States Patent
Shemtov

(10) Patent No.: US 8,586,881 B1
(45) Date of Patent: Nov. 19, 2013

(54) CONNECTOR ASSEMBLY SUITED FOR WET LOCATIONS

(76) Inventor: Sami Shemtov, Hollywod, FL (US)

( * ) Notice: Subject to any disclaimer, the term of this patent is extended or adjusted under 35 U.S.C. 154(b) by 275 days.

(21) Appl. No.: 13/114,527

(22) Filed: May 24, 2011

Related U.S. Application Data

(63) Continuation-in-part of application No. 12/725,502, filed on Mar. 17, 2010, now Pat. No. 8,129,633.

(51) Int. Cl.
*H02G 3/18* (2006.01)
(52) U.S. Cl.
USPC ........... 174/652; 174/655; 174/656; 439/583; 285/382.7; 248/56
(58) Field of Classification Search
USPC .................. 174/650, 652, 653, 656, 655; 285/382.7, 151.1, 342; 248/56; 439/578, 583, 584
See application file for complete search history.

(56) References Cited

U.S. PATENT DOCUMENTS

| | | | |
|---|---|---|---|
| 4,088,348 A | 5/1978 | Shemtov | |
| 4,159,134 A | 6/1979 | Shemtov | |
| 4,159,859 A | 7/1979 | Shemtov | |
| 4,606,562 A * | 8/1986 | Saraceno | 174/652 |
| D287,396 S | 12/1986 | Shemtov | |
| 4,641,863 A | 2/1987 | Shemtov | |
| D376,415 S | 12/1996 | Shemtov | |
| 6,352,439 B1 * | 3/2002 | Stark et al. | 174/655 |
| 6,476,319 B1 | 11/2002 | Shemtov | |
| 6,488,318 B1 * | 12/2002 | Shim | 285/382.7 |
| 6,808,181 B1 | 10/2004 | Shemtov | |
| 6,835,088 B2 | 12/2004 | Shemtov | |
| 6,939,160 B2 | 9/2005 | Shemtov | |
| 6,988,746 B2 * | 1/2006 | Olson | 285/151.1 |
| 7,055,868 B2 * | 6/2006 | Watanabe | 285/382.7 |
| 7,126,064 B1 | 10/2006 | Shemtov | |
| 7,270,351 B2 * | 9/2007 | Chelchowski et al. | 285/382.7 |
| 7,476,817 B1 | 1/2009 | Shemtov | |
| 7,604,261 B2 * | 10/2009 | Kiely | 285/342 |
| 7,635,816 B1 | 12/2009 | Shemtov | |
| 7,841,630 B1 * | 11/2010 | Auray et al. | 285/151.1 |
| 8,129,633 B1 * | 3/2012 | Shemtov | 174/652 |
| 2005/0194785 A1 | 9/2005 | Shemtov | |

* cited by examiner

*Primary Examiner* — Angel R Estrada
(74) *Attorney, Agent, or Firm* — Craig A. Fieschko, Esq.; DeWitt Ross & Stevens, S.C.

(57) ABSTRACT

A compression ring includes an outer surface opposing an inner surface, with teeth extending radially inwardly from the inner surface. First and second circumferential ends are complementarily interfittable, and are separated by a circumferential gap, allowing the compression ring to be compressable when being installed in a connector assembly. First and second axial ends of the compression ring are chamfered to facilitate compression. The teeth extend circumferentially from the first and second circumferential ends and are complementary to conduit threading. Each tooth includes first and second sides, with the first side perpendicular to the inner surface to resist pullout of a conduit from the connector assembly. The teeth terminate in sharp points for better gripping of unthreaded conduits. A compressed compression ring accommodates threaded conduits by complementarily mating with threading, and unthreaded conduits by biting into their outer surfaces. Internal and external sealing gaskets provide seals from moisture.

22 Claims, 9 Drawing Sheets

CONNECTOR ASSEMBLY SUITED FOR WET LOCATIONS

CROSS-REFERENCE TO RELATED APPLICATIONS

This application is a continuation-in-part of U.S. patent application Ser. No. 12/725,502 filed Mar. 17, 2010 now U.S. Pat. No. 8,129,633, which is incorporated by reference herein.

FIELD OF THE INVENTION

This document concerns an invention relating generally to connector assemblies suited for wet locations.

BACKGROUND OF THE INVENTION

Electrical and mechanical components such as cables often need to be connected with each other through various angles and configurations. Conduits (such as pipes) and junction boxes may be used to house electrical cables, and connectors are used to join conduits with each other and/or with other components such as junction boxes in desired configurations. For example, U.S. Pat. No. 7,635,816 to Shemtov discloses a connector/bushing assembly for electrical junction boxes. Connector assemblies make use of such connector elements as connector bodies, nuts, gaskets, and bushings to provide the configurations desired for the conduits that house electrical and mechanical components.

The components brought together by connector assemblies can be sensitive to contaminants such as dust and moisture. If a proper seal is not formed between and among the elements of the connector assembly, the electrical and mechanical components are susceptible to contamination and thus not adequately protected. What is needed is a versatile connector assembly that provides superior resistance to contaminants like dust and moisture.

Additionally, traditional connector assemblies are not able to accommodate both threaded and unthreaded conduits. For example, a connector assembly with a compression ring having a smooth inner surface is intended to secure unthreaded conduits. Similarly, existing repair coupling assemblies are intended to secure threaded conduits. What is needed is a versatile connector assembly able to conveniently accommodate both threaded and unthreaded conduits in different situations.

SUMMARY OF THE INVENTION

The invention, which is defined by the claims set forth at the end of this document, is directed to connector assemblies which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring initially to FIG. 1, an exemplary connector assembly 100 includes a connector body 150, a compression ring 130, a compression nut 120, and a sealing ring 140, each of which is preferably cylindrical. As shown in FIG. 2, the connector body 150 may be inserted in the compression nut 120, with the compression nut 120 pressing against the compression ring 130, the compression ring 130 pressing against the sealing ring 140, and the sealing ring 140 pressing against the connector body 150. An optional conduit 110 may be inserted through the compression nut 120. The compression ring 130 helps secure the conduit 110 to the connector assembly 100. The pressing of the sealing ring 140 against the connector body 150 helps form a superior seal between the connector body 150 and the conduit 110. This seal resists contaminants such as dust and moisture. The interaction of the various components is further discussed below.

Returning to FIG. 1, the compression nut 120 further includes a nut first axial end 200 and a nut second axial end 190. The nut first axial end 200 preferably has a nut first end inner surface 370 that is threaded. The nut second axial end 190 may have a nut second end outer surface 360 that is irregular to enhance gripping.

As shown in FIG. 3, the connector body 150 includes a connector first axial end 250, a connector second axial end 230, and a connector middle axial portion 240 positioned between the connector first axial end 250 and the connector second axial end 230. The connector first axial end 250 preferably includes a connector first end outer surface 350 that is threaded, and the connector second axial end 230 preferably includes a connector second end outer surface 320 that is threaded. The connector middle axial portion 240 may include a connector middle outer surface 380 that is irregular for easier gripping.

As shown in FIG. 4, the compression ring 130 includes a first circumferential end 280 and a second circumferential end 290 that is complementarily interfittable with the first circumferential end 280. The compression ring 130 also includes a circumferential gap 300 between the first circumferential end 280 and the second circumferential end 290. The circumferential gap 300 of the compression ring 130 allows the compression ring 130 to compress, such compression bringing the first circumferential end 280 and second circumferential end 290 closer together and narrowing the circumferential gap 300. Referring also to FIG. 2, once the sealing ring 140 is pressed against the connector body 150, the screwing of the compression nut 120 with the connector body 150 compresses the compression ring 130. Once the compression ring 130 is tightly wrapped around the conduit 110, the compression nut 120 no longer screws with the connector body 150. The circumferential gap 300 narrows but need not close for the conduit 110 to be secured to the connector assembly 100. The compression ring 130 may optionally include a bevel 260, enhancing compression of the compression ring 130 and the interaction of the compression ring 130 with the sealing ring 140.

As depicted in FIG. 2, the connector body 150 preferably interfaces with the compression nut 120 by having its connector second axial end 230 screw into the nut first axial end 200 through the interaction of the threaded surfaces 320 (see FIG. 3) and 370 (see FIG. 1). The compression ring 130 and sealing ring 140 may be positioned within the compression nut 120, preferably within the nut second axial end 190. The inner surfaces 340 and 310 of the connector first axial end 250 and the connector second axial end 230, respectively, may be substantially smooth, making it easier for a conduit 110, electrical cable (not pictured), or other component to be inserted therein.

Returning to FIG. 1, the sealing ring 140 includes a sealing ring first axial end 220 and a sealing ring second axial end 210 opposing the sealing ring first axial end 220. The diameter of the sealing ring first axial end 220 is preferably less than the diameter of the sealing ring second axial end 210. The connector second axial end 230 optionally includes a connector chamfer 270 (see FIG. 3), making the connector body 150 more interfittable with the sealing ring 140. The connector chamfer 270 presses against the sealing ring first axial end 220 (with the smaller diameter) as a result of the connector body 150 screwing into the compression nut 120. Such interaction of the sealing ring 140 with the connector chamfer 270 enhances the water- and contaminant-resistance of the connector assembly 100. The sealing ring second axial end 210 may additionally include a sealing ring chamfer 330 (see FIG. 2) that is more interfittable with a compression ring first axial end 400 (see FIG. 4).

As depicted in FIG. 2, the connector first end outer surface 350 (see FIG. 3) of the connector first axial end 250 may interface with nuts, junction boxes, or other assembly components via an optional gasket 160, locknut 170, and bushing 180. The connector first axial end 250 (with gasket 160 thereon and bushing 180 therein) may be inserted through a first side of an opening in a junction box, and the locknut 170 may be screwed onto the connector first axial end 250 from a second side of the opening in the junction box, securing the connector body 150 to the junction box (not pictured). As an electrical cable, for example, is inserted through the opening of the junction box and through the connector first axial end 250, the bushing 180 protects the electrical cable from chaffing against the connector first axial end 250. The gasket 160, the locknut 170, and the bushing 180 resist contaminants between the connector body 150 and the junction box.

The connector body 150, the compression ring 130, and the compression nut 120 may be made of metal or plastic, constructed using, for example, steel. The sealing ring 140 is preferably non-metal, made of, for example, nylon or other insulating material. The gasket 160 may be made of an elastomer such as rubber, the locknut 170 may be made of a metal or plastic, and the bushing 180 may be made from an insulating material such as nylon.

The exemplary connector assembly 100 described herein, along with variations thereof, is a versatile assembly that provides superior protection against contaminants and moisture. Further advantages and features of the invention will be apparent from the remainder of this document in conjunction with the associated drawings.

Connector assemblies 100 can incorporate the above and/or other components depending on what is appropriate for a particular setting. Referring to FIG. 5A, an alternative compression ring 500 includes a compression ring outer surface 505 opposing a compression ring inner surface 510, with a set of teeth 515 extending radially inwardly from the compression ring inner surface 510. The compression ring 500 extends from a first circumferential end 520 to a second circumferential end 525, with the first circumferential end 520 being complementarily interfittable with the second circumferential end 525. A circumferential gap 530 provides a space between the first circumferential end 520 and the second circumferential end 525, allowing the compression ring 500 to be compressable when installed in a connector assembly 100 (as the first circumferential end 520 is brought toward the second circumferential end 525). The compression ring 500 extends from a compression ring first axial end 535 to a compression ring second axial end 540, and at least one, and preferably both, of the compression ring first axial end 535 and the compression ring second axial end 540 is chamfered 536/541. At least some of the teeth 515 extend circumferentially from the first circumferential end 520 to the second circumferential end 525, allowing the teeth 515 to serve as inner surface threading.

Referring to FIGS. 5B and 5C, each tooth in the set of teeth 515 includes a tooth first side 550 and a tooth second side 555, with the tooth first side 550 facing the compression ring first axial end 535, and the tooth second side 555 facing the compression ring second axial end 540. The angles between the tooth sides 550, 555 and the compression ring inner surface 510 can vary greatly to give a variety of shapes to each tooth in the set of teeth 515. Despite the particular shape of the teeth 515, each tooth preferably terminates in a sharp point 560 to enhance the ability of the compression ring 500 to grip conduits 800, especially conduits 800 that lack threading. Each tooth side 550, 555 can make an angle ranging from, for example, 45 degrees to 135 degrees, with respect to the compression ring inner surface 510 (the compression ring inner surface 510 being horizontal in FIGS. 5B and 5C). To enhance the ability of the compression ring 500 to resist pullout of conduits 800 from connector assemblies 100, the second side 555 preferably is approximately perpendicular to the compression ring inner surface 510. With a perpendicular tooth second side 555, the tooth first side 550 makes an angle that is preferably less than 90 degrees, resulting in the sharp point 560 of each tooth.

Depending on the structure of the compression ring 500, a line that is perpendicular with the compression ring inner surface 510 would not necessarily be perpendicular to a conduit outer surface 810 of the conduit 800 (see FIG. 6) passing through the compression ring 500 (because, e.g., the thickness of the compression ring 500 can vary from the compression ring outer surface 505 to the compression ring inner surface 510). When a tooth first second side 555 that is perpendicular to the compression ring inner surface 510 would not be perpendicular to the conduit outer surface 810, the tooth second side 555 may instead be perpendicular to a central longitudinal axis of the compression ring 500. The central longitudinal axis is defined as a line that is perpendicular to a compression ring bisecting plane, the bisecting plane axially bisecting the compression ring 500 midway between the compression ring first axial end 535 and the compression ring second axial end 540. Teeth 515 that have a side that is perpendicular to the conduit outer surface 810 are better able to grip and secure the conduit 800 to the connector assembly 100 and resist its pullout therefrom. The teeth 515 are better able to resist conduit pullout if vertical sides 555 face away from the direction of the pull force. In such a scenario, vertical sides 555 act like "walls" that oppose pullout of conduit 800 from the connector assembly 100. On the other hand, if the angled sides 550 face away from the pull force, the pipe is more likely to slide out because the angled sides 550 would act like "ramps." If a conduit 800 were to engage the compression ring 500 of FIG. 5B as part of a connector assembly 100, the teeth 515 would provide the greatest resistance to pullout if the conduit 800 were pulled out in a rightward direction (with the vertical sides 555 behaving as "walls"). If the conduit 800 were pulled out from connector assembly 100 in a leftward direction in FIG. 5B, the teeth 515 would not resist conduit pullout to the same degree (as the angled sides 550 would behave more as "ramps").

Referring to FIGS. 6 and 8, the compression ring 500 is well-suited for use with a conduit 800 sized to fit through the compression ring 500. The conduit 800 has a conduit inner surface 805 opposing a conduit outer surface 810, with at least a portion 815 of the conduit outer surface 810 being either threaded or substantially smooth (i.e., unthreaded). The conduit 800 is securable to the conduit 800 by having the compression ring threading 515 engage the conduit outer surface 810. If the conduit outer surface 810 is threaded, the set of teeth 515 of the compression ring 500 complementarily engages the conduit outer surface 810 threads using teeth 515, the teeth 515 preferably being axially spaced to be complementary to the threading 815. If the conduit outer surface 810 is unthreaded, the preferably sharp points 560 (see FIGS. 5B and 5C) of the set of teeth 515 are able to bite into the substantially smooth conduit outer surface 810 to better secure the compression ring 500 to the conduit 800.

The compression ring 500 is also well-suited for use with a compression nut 600 and a connector 700 (such as the coupling body connector shown in FIGS. 6, 7A, and 7B, or the repair coupling connector shown in FIGS. 8, 9A, and 9B, collectively referred to as the connector 700). The compression nut 600 includes a compression nut first axial end 605 having a first passage diameter, and a compression nut second axial end 610 having a second passage diameter. The first passage diameter is smaller than the second passage diameter, with the compression nut second axial end 610 being sized to receive the compression ring 500 and the conduit 800 therein. The connector 700 includes a connector first axial end 705 and a connector second axial end 710. As the connector first axial end 705 is inserted into the compression nut second axial end 610, the connector first axial end 705 begins to press against the compression ring second axial end 540. The compression ring 500 is compressed as it is sandwiched between the connector first axial end 705 and the compression nut first axial end 605, bringing the compression ring first and second circumferential ends 520, 525 closer together. With the compression ring 500 fully compressed, the first and second circumferential ends 520, 525 complementarily abut each other.

More specifically, the compression nut second axial end 610 includes a compression nut second end inner surface 615 opposing a compression nut second end outer surface 620, with the compression nut second end inner surface 615 being threaded. The connector first axial end 705 includes a connector first end inner surface 715 opposing a connector first end outer surface 720, with the connector first end outer surface 720 being threaded. Referring to FIGS. 7A, 7B, 9A, and 9B, the connector first axial end 705 may be screwed into the compression nut second axial end 610, with the compression ring 500 positioned within the compression nut second axial end 610, and with the conduit 800 extending through the compression nut 600. As the compression ring 500 is compressed between the compression nut first axial end 605 and the connector first axial end 705, the set of teeth 515 of the compression ring 500 engage at least a portion of the conduit outer surface 810. The grip of the compression ring 500 on the conduit 800 is enhanced as the compression ring 500 becomes more compressed. The compression nut first axial end 605, the compression ring first and second axial ends 535, 540, and the connector first axial end 705 are preferably all chamfered 606, 536, 541, 706 to facilitate compression of the compression ring 500. As the compression nut 600 is tightened or loosened about the connector first axial end 705, the circumferential gap 530 allows the compression ring 500 to contract and expand (as the circumferential gap 530 is closed and opened), respectively.

The connector 700 is configured such that the connector second axial end 710 is securable to other components, such as an electrical junction box 825 or a second conduit 800, coupling the conduit 800 with additional components. For example, the coupling body connector second axial end 710 may interface with the junction box 825 shown as a cutaway in FIG. 6 (using a locknut 830), or a second conduit 800 may extend through the repair coupling connector second axial end 710, as shown in FIGS. 9A and 9B. The connector second axial end 710 of the coupling body connector 700 has a smaller diameter than its connector first axial end 705, approximating the diameter of the conduit 800 through the connector second axial end 710 (as shown in FIGS. 7A and 7B), and enhancing the continuity of conduit 800 with coupled components. The repair coupling connector 700 allows two conduits 800 to be secured to each other with the conduits 800 abutting each other at their ends (as shown in FIGS. 9A and 9B), enhancing continuity for components extending through these two conduits 800.

Returning to FIG. 6, an internal sealing gasket 850 and an external sealing gasket 855 enhance the ability of the connector assembly 100 to seal from contaminants such as dust and moisture. With the coupling body connector 700 shown in FIGS. 7A and 7B, the internal sealing gasket 850 is positioned within the connector first axial end 705, and the external sealing gasket 855 is positioned about the connector second axial end 710 (not pictured).

The exemplary connector assemblies 100 described herein, along with variations thereof, provide for versatile assemblies well-suited to a variety of applications, incorporating both threaded and unthreaded conduits. Further advantages and features of the invention will be apparent from the remainder of this document in conjunction with the associated drawings.

DETAILED DESCRIPTION OF PREFERRED VERSIONS OF THE INVENTION

Figure 1:
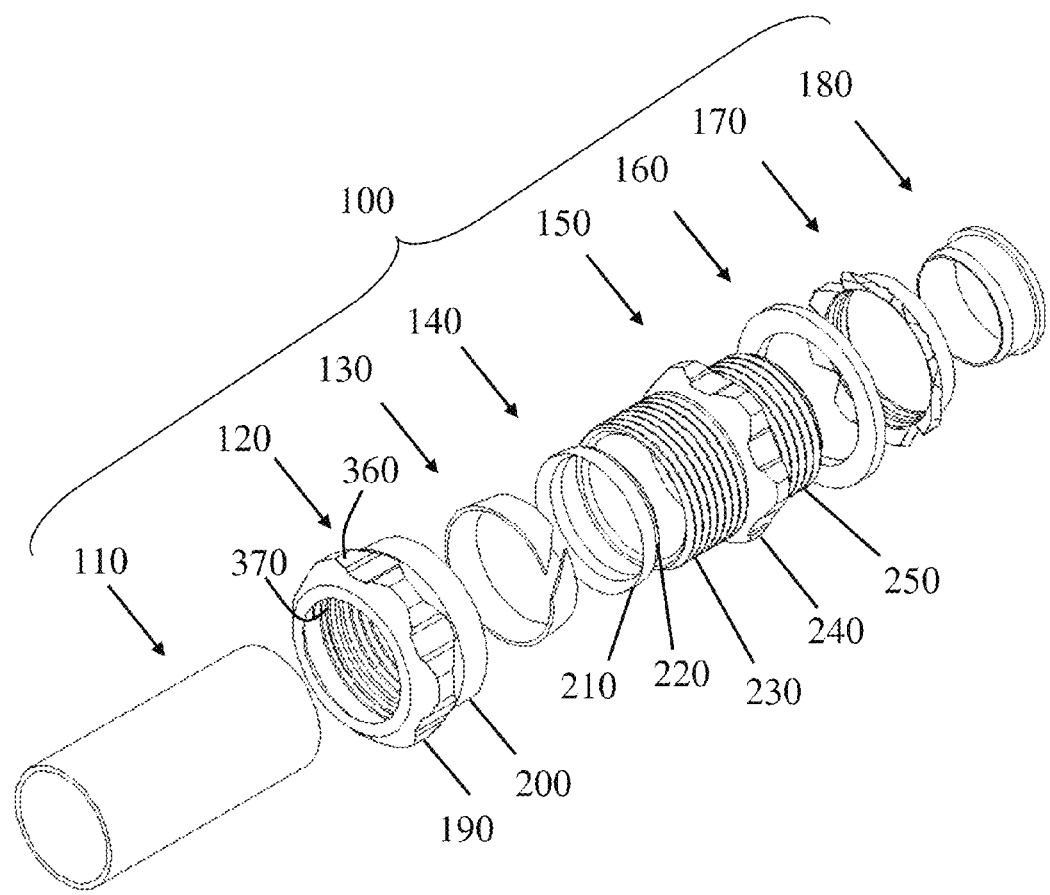
FIG. 1 is an exploded perspective view of an exemplary connector assembly 100.

Continuing the discussion in the Summary section, the configuration of the connector assembly 100 shown in FIG. 1 is merely exemplary, and the numbers and types of components used in an assembly can be changed as desired. For example, connector bodies 150 and compression nuts 120 can be added or taken away, and the selected components can be interfaced together as needed, optionally using additional compression rings 130 and sealing rings 140 to secure conduits 110 and to enhance the seal formed between the selected components. Another compression nut 120, compression ring 130, and sealing ring 140 can be interfaced with the connector first axial end 250, for example, so that connector body 150 bridges two conduits 110.

The inner and outer surfaces of the components can be substantially smooth, irregular, or threaded so that they can be slid past each other, gripped, or screwed together as needed. Additionally, the diameters of their various ends can be adjusted to permit the components to interface with each other and other components as desired. Further, the axial lengths of the various components can be adjusted so that they can better accommodate each other or additional components of varying dimensions. Furthermore, the diameter of any of the components used in the connector assembly 100 need not remain constant along the axial length of the component. For example, the diameter of the connector body 150 may be variable along its axial length, increasing or decreasing gradually or in a stepwise fashion from the first connector end 250 to the second connector end 230. Additionally, the diameter of the sealing ring 140 may vary in a stepwise fashion from the first sealing ring end 220 to the second sealing ring end 210, rather than varying gradually along its axial length.

Figure 3:
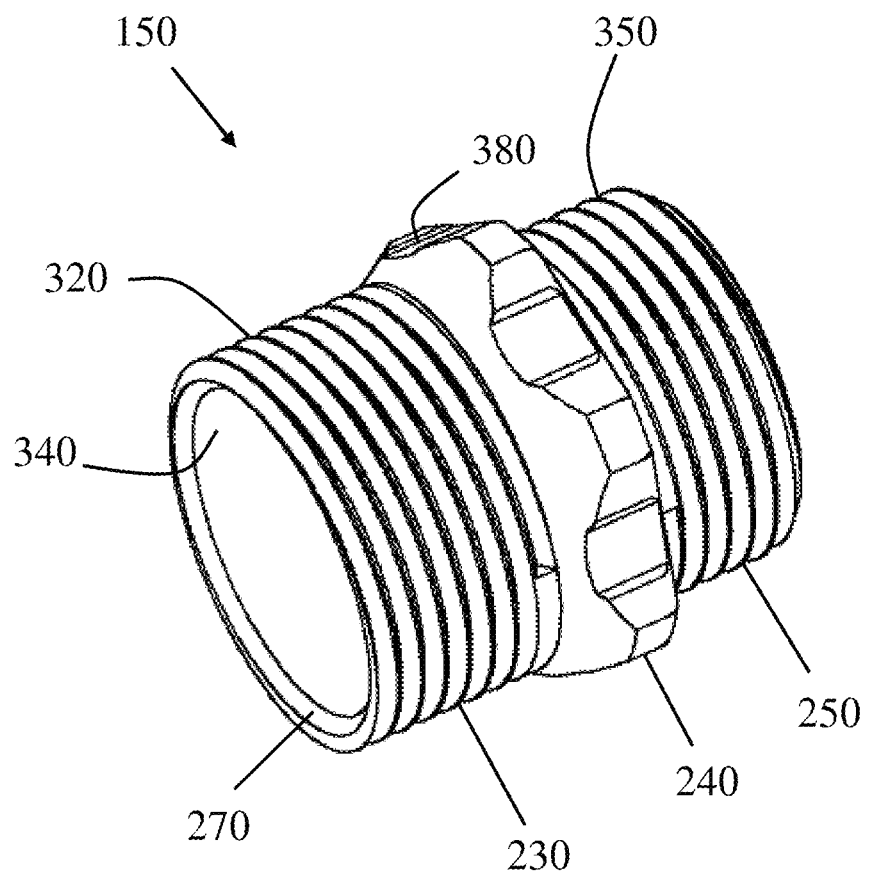
FIG. 3 is a perspective view of the connector body 150 in the connector assembly 100 of FIG. 1.

The connector assembly 100 can be further modified in many ways, enhancing its versatility. As depicted in FIG. 3, the connector body 150 has connector first axial end 250 and connector second axial end 230 with substantially the same diameter. However, the diameter of the connector first axial end 250 may be different from the diameter of the connector second axial end 230. For example, the connector first axial end 250 may be given one diameter so that it may interface with a given junction box, and the connector second axial end 230 may be given another diameter so that it interface with a particular compression nut 120 that can house a conduit 110 with another diameter.

Figure 2:
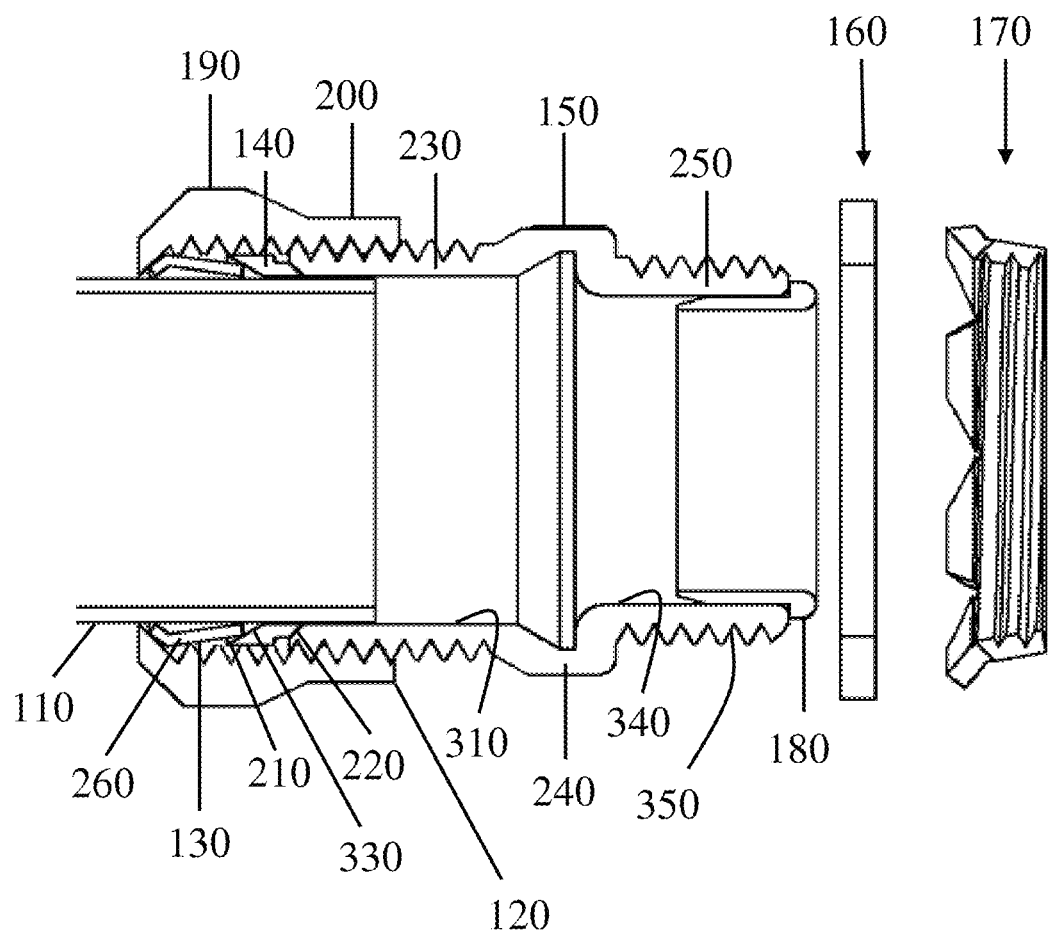
FIG. 2 is a cross-section view of the connector assembly 100 of FIG. 1.
Figure 4:
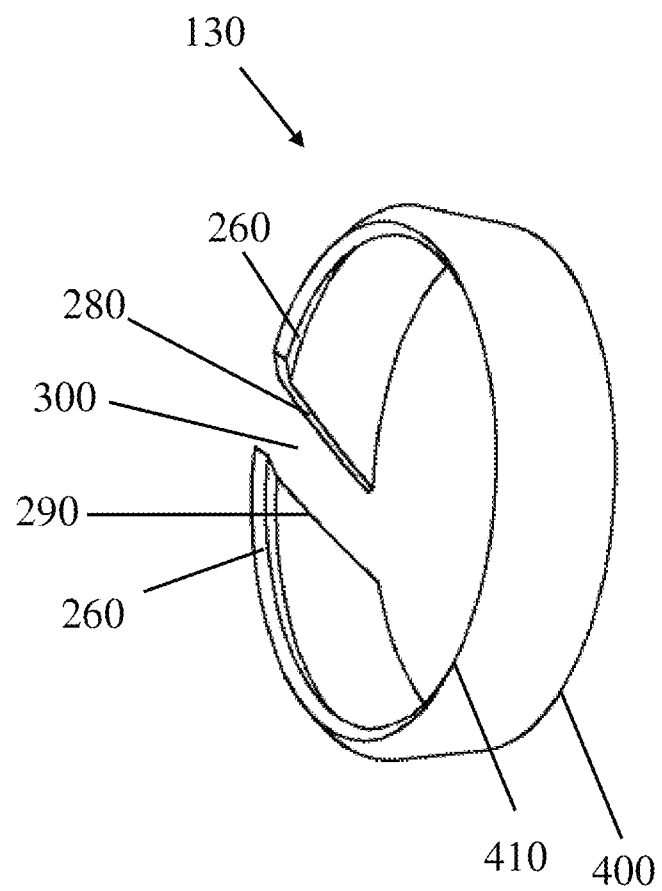
FIG. 4 is a perspective view of the compression ring 130 in the connector assembly 100 of FIG. 1.

Referring to FIG. 4, the compression ring 130 may be shaped in a variety of different ways. For example, compression ring 130 may alternatively or additionally include an outward radial bulge that is axially positioned between the first axial compression ring end 400 and a second axial compression ring end 410. Such a radial bulge may press against the inner surface of the component in which it is inserted, such as against the nut first end inner surface 370 (see FIG. 1) as the connector second axial end 230 screws into the nut first axial end 200 (see FIG. 2). Additionally, the compression ring 130 need not include the bevel 260. Moreover, the complementarily interfittable circumferential ends 280 and 290 can alternatively be shaped as complementary geometric shapes, curves, teeth, or any male/female combination of shapes that can fit together.

The circumferential gap 300 can vary greatly in size. The circumferential gap 300 need not close in order to secure the conduit 110 (see FIG. 2) to the connector assembly 100. In other words, the first circumferential end 280 of the compression ring 130 need not make contact with the second circumferential end 290 of the compression ring 130 in order for the connector assembly 100 to be secured with the conduit 110 or for the sealing ring 140 to form a superior seal against contaminants and moisture.

The radial thicknesses of the various components may also be adjusted as desired. For example, a larger radial thickness at the connector second axial end 230 would permit a larger connector chamfer 270, which in turn may enhance the seal formed between the components of the connector assembly 100.

The descriptions and variations discussed above with respect to the versions exemplified by FIGS. 1-4 can be equally applicable to versions exemplified by FIGS. 5-9. Similarly, the descriptions and variations discussed below with respect to versions exemplified by FIGS. 5-9 can be equally applicable to versions exemplified by FIGS. 1-4.

Figure 5A:
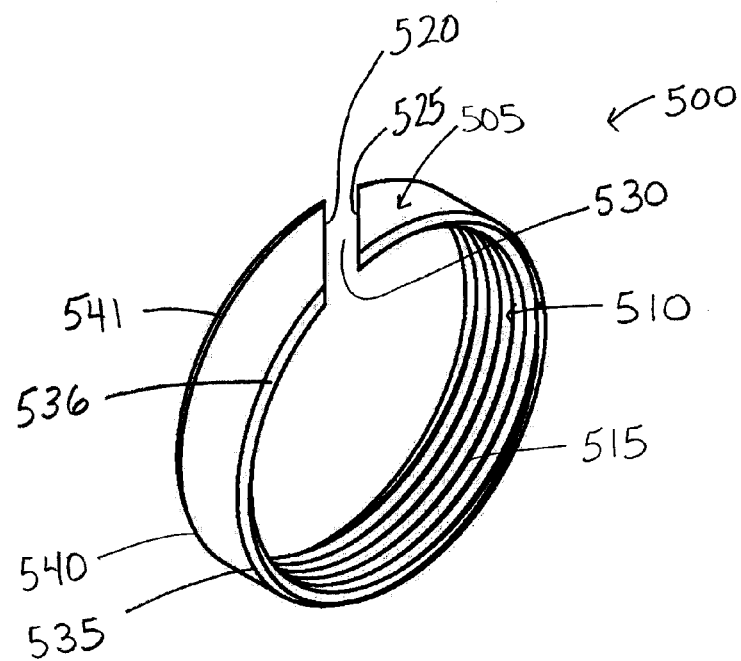
FIG. 5A is a perspective view of the compression ring 500 having a set of teeth 515 and at least one axial end 535, 540 that is chamfered 536, 541.
Figures 5B, 5C:
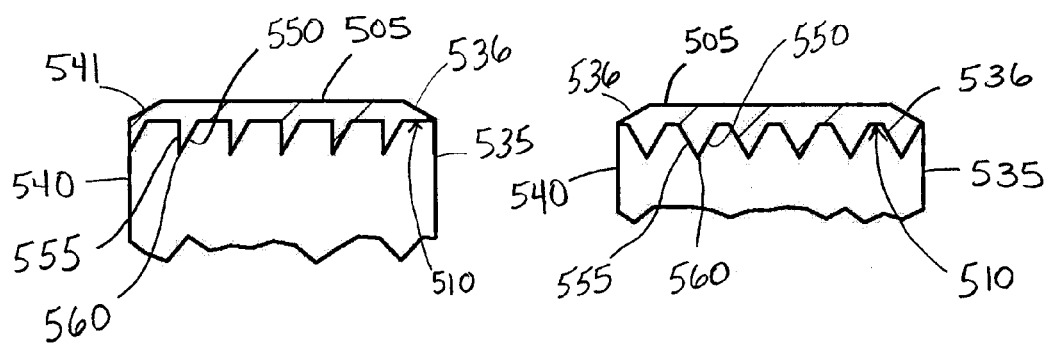
FIG. 5B is a cross-section of the compression ring 500 of FIG. 5A showing the set of teeth 515 shaped as half-sections.
FIG. 5C is a cross-section of the compression ring 500 of FIG. 5A showing the set of teeth 515 shaped as full-sections.
Figure 6:
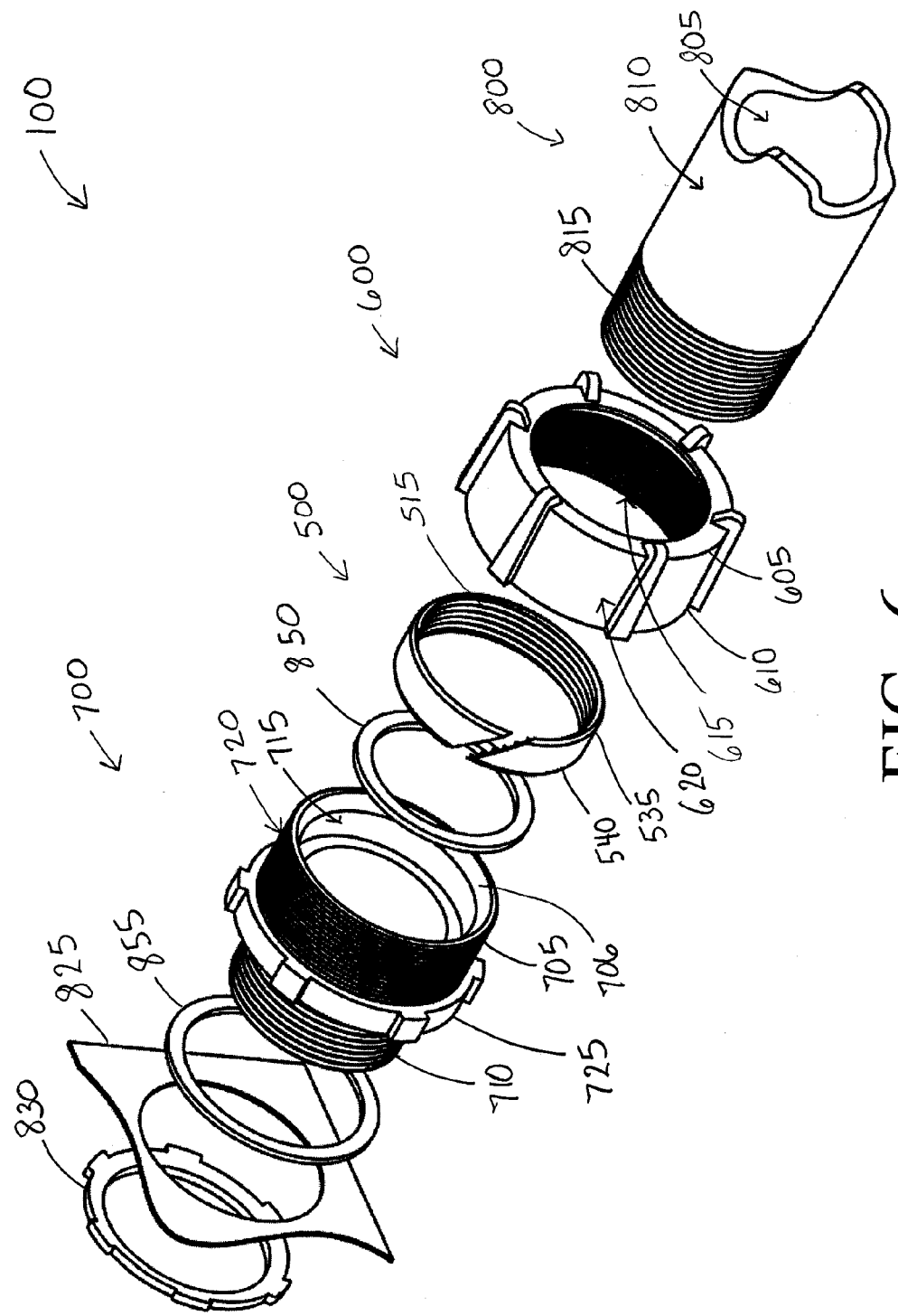
FIG. 6 is an exploded perspective view of an exemplary connector assembly 100 incorporating the compression ring 500 of FIG. 5A and a coupling body connector 700, with a cutaway portion of a junction box 825.
Figure 7A:
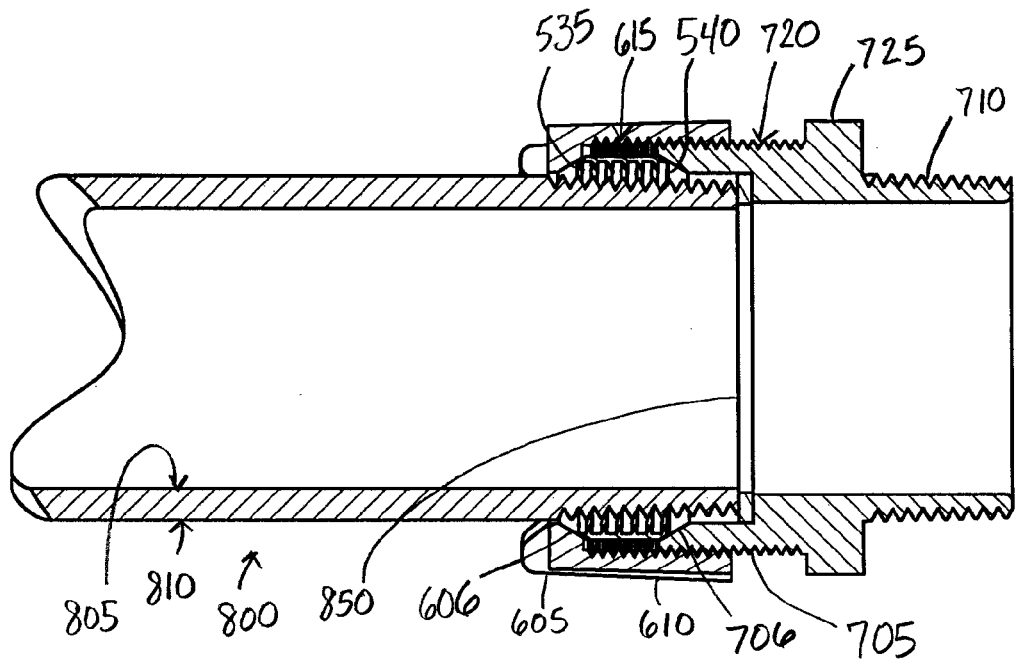
FIG. 7A is a cross-section of selected assembled components from the connector assembly 100 of FIG. 6, showing a conduit 800 having a threaded portion.
Figure 7B:
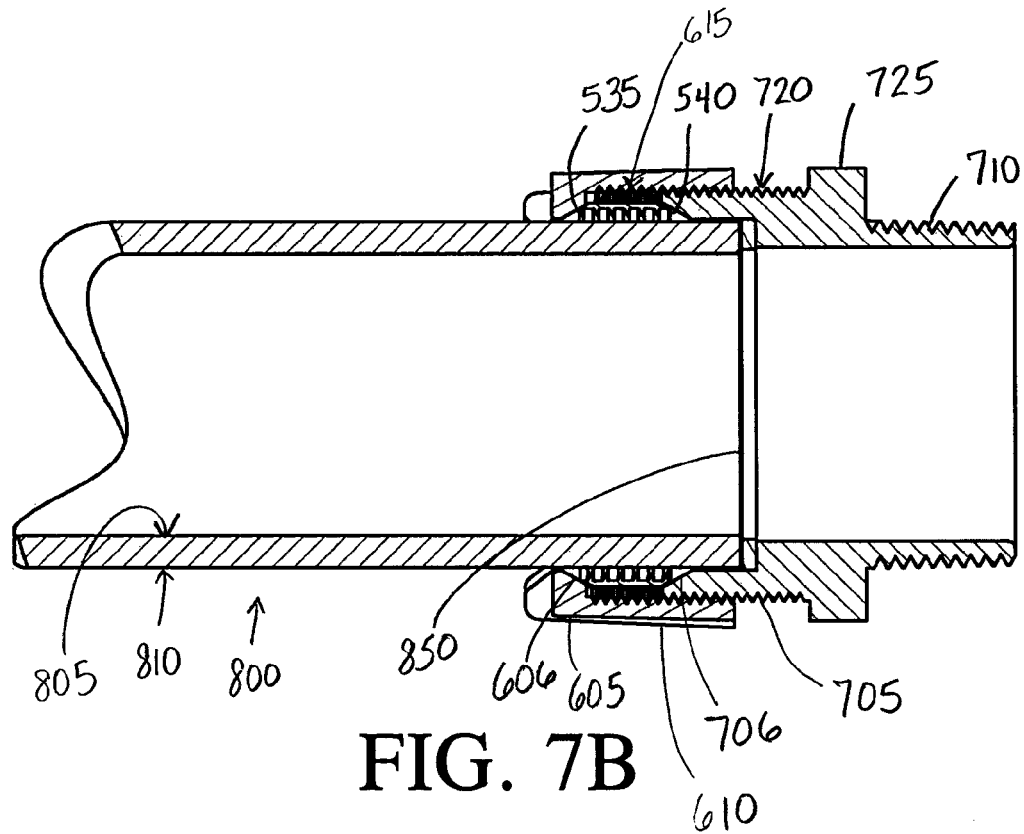
FIG. 7B is a cross-section of selected components from the connector assembly 100 of FIG. 6, showing a conduit 800 that is unthreaded.

Referring initially to the cross-section of the teeth 515 in FIG. 5B, the teeth 515 are shown as "half-sections" outlining a right triangle, with the base of the triangle aligned with the compression ring inner surface 510. The vertical side 555 of the triangle is substantially perpendicular to the base of the right triangle, and the hypotenuse 550 completes the triangle so as to provide a sharp point 560. FIG. 5C shows the teeth 515 in "full-sections" outlining triangles which approximate two back-to-back right triangles from FIG. 5B. In FIGS. 5A and 5B the compression ring 500 is chamfered 536, 541 at both axial ends 535, 540. It is noted that if only one axial end of the compression ring 500 is chamfered 536/541, the vertical side 555 in FIG. 5B preferably faces away from the direction of conduit 800 pullout. The vertical face 555 of the teeth 515 in FIG. 5B generally provides a better barrier to pullout than a face making an angle less than 90 degrees. As the connector assemblies 100 are depicted in FIGS. 7A and 7B, the direction of pullout of the conduits 800 would be in a leftward direction.

Figure 8:
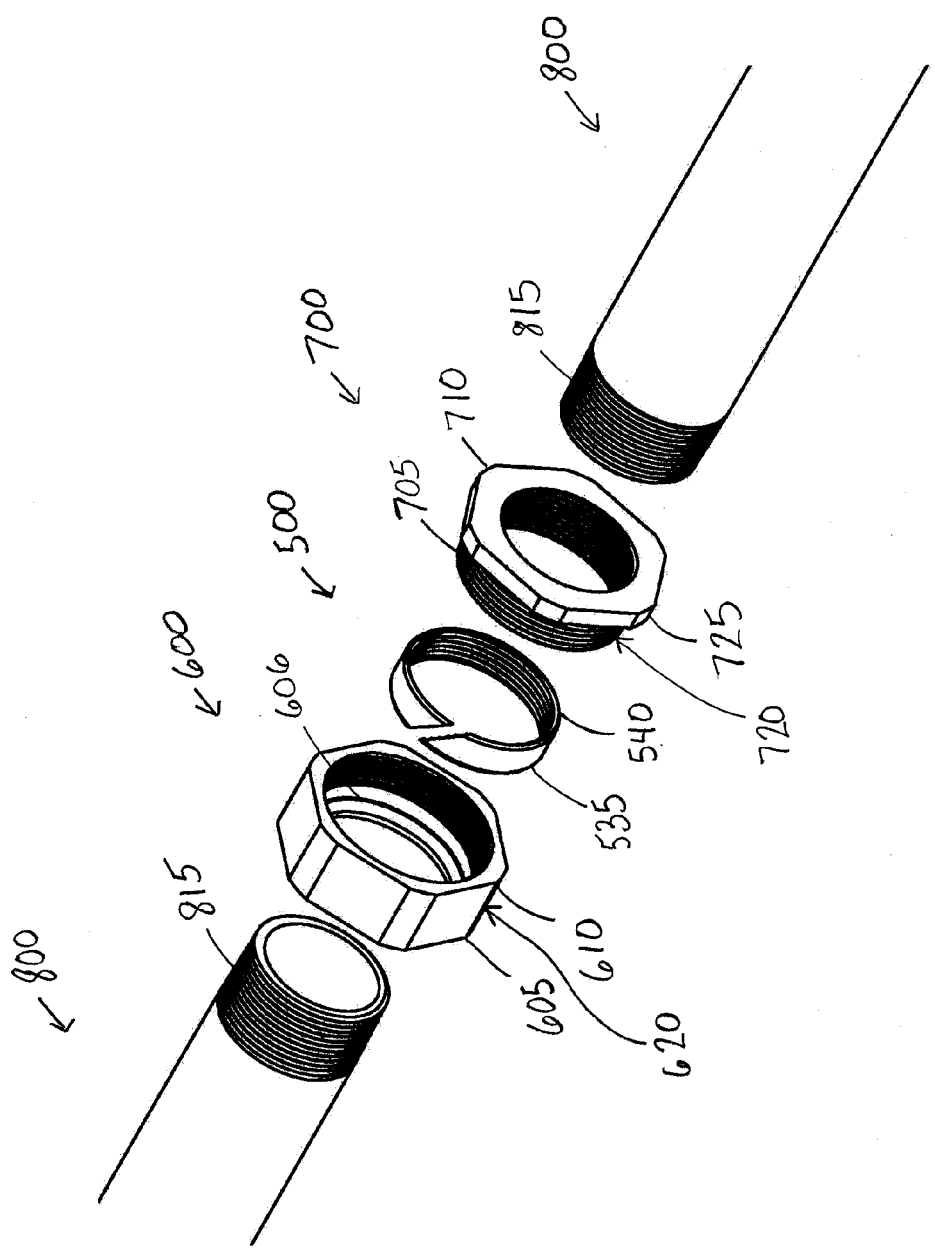
FIG. 8 is an exploded perspective view of an exemplary connector assembly 100 incorporating the compression ring 500 of FIG. 5A and a repair coupling connector 700.
Figure 9A:
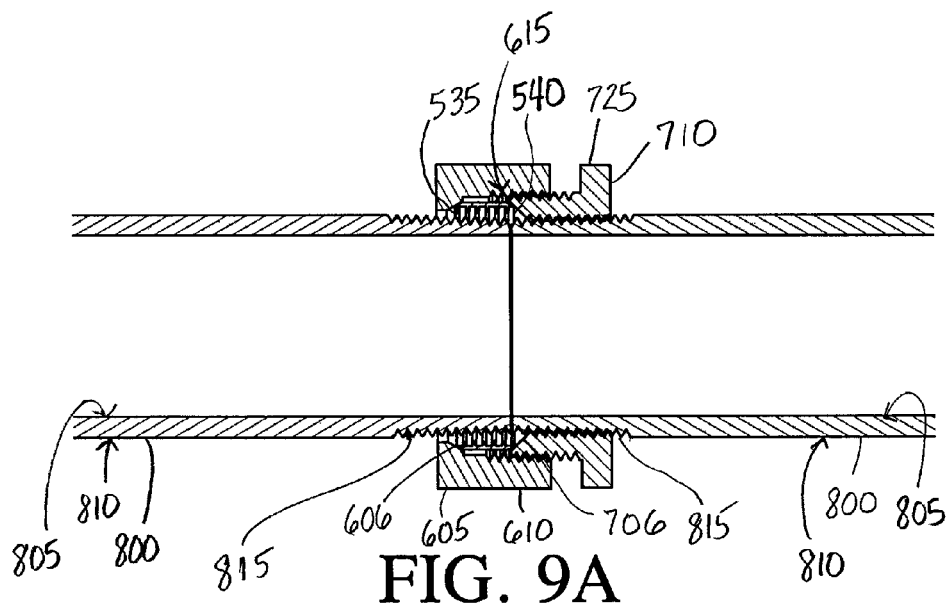
FIG. 9A is a cross-section of the exemplary connector assembly 100 of FIG. 8 assembled, showing two conduits 800, each conduit 800 having threaded portions.
Figure 9B:
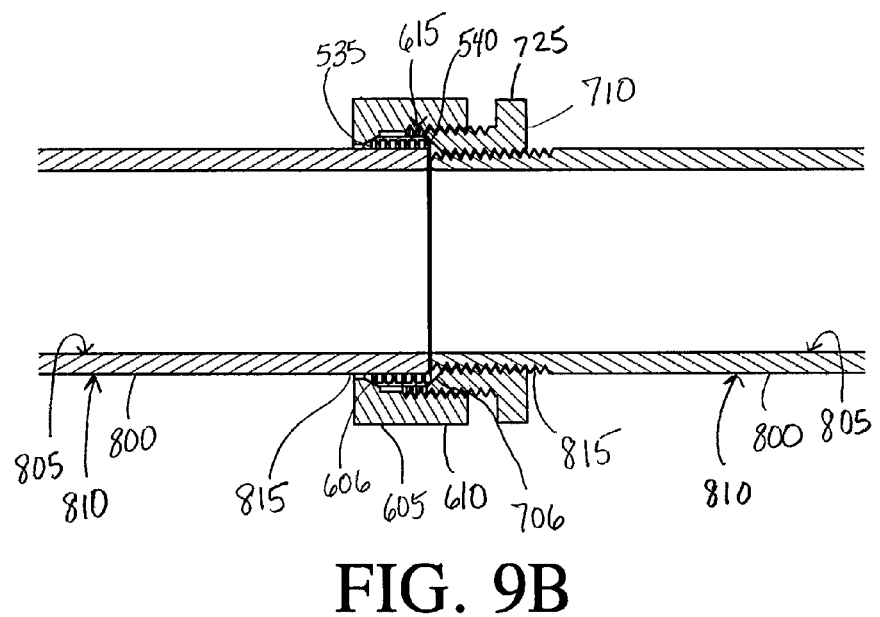
FIG. 9B is a cross-section of the exemplary connector assembly 100 of FIG. 8 assembled, showing one threaded conduit 800 and one unthreaded conduit 800.

One or more of FIGS. 6, 7A, 8, 9A, and 9B show threaded conduits 800 interacting with compression ring 500, the compression nut 600, the connector 700 and/or the internal sealing gasket 850. Examples of threaded conduits 800 include a threaded Rigid Metal Conduit ("RMC") and a threaded Intermediate Metal Conduit (IMC). FIGS. 7B and 9B show unthreaded conduits 800 incorporated in connector assemblies 100. Examples of unthreaded conduits 800 include unthreaded RMC and unthreaded IMC conduits, as well as unthreaded thin wall Electrical Metal Conduits ("EMTs"). RMC and IMC conduits are sold in specific lengths (often ten feet), and are already threaded. When installing these conduits in a building, for example, the installer usually needs to cut the conduit so that it fits in a particular space. Cutting the conduit, however, removes the threaded end, making it unfit for traditional repair coupling connector assemblies 100. A costly and inconvenient option is to rethread the naked end of the conduit using a bulky pipe threading machine. The need to rethread cut conduits is eliminated with the threaded compression ring 500 because the teeth 515 allow even unthreaded cut end of conduits 800 to be secured. The serrated teeth 515 of the compression ring 500 provide sharp points 560 with which to grip the unthreaded conduits 800.

Moreover, the threaded compression ring 500 makes the connector assembly 100 usable with threaded conduits 800 as well. That is, the teeth 515 of the threaded compression ring 500 allow the compression ring 500 to function with connector assemblies 100 that otherwise would require unthreaded conduits 800 to work. For example, if only a threaded conduit 800 (before the threaded portion of the conduit 800 is cut away) is available in the field, an unthreaded compression ring 500 would not be able to secure the threaded conduit 800 because the compression ring 500 with a smooth inner surface is not able to grip the grooves of the threaded conduit 800. But the teeth 515 of the threaded compression ring 500 are able to mate with the threads of the threaded conduit 800 as the compression ring 500 is compressed, letting the user secure threaded conduits 800 as well. It is noted that in such a case, the sharpness of the compression ring teeth 515 do not play a role in gripping the threaded conduit 800 because the threads of the compression ring 500 engage the threads of the pipe complementarily. The sharp points 560 of the compression ring 500, however, provide the versatility to use this compression ring 500 with either threaded or unthreaded conduits 800.

Another advantage of the threaded compression ring 500 is that a (potentially bulky and heavy) threaded conduit 800 does not need to be rotated when being installed or replaced. Conduits 800 can have diameters of up to four inches, and with lengths of ten feet, can weigh about 150 pounds. When a conduit must be secured to a traditional connector assembly (or disengaged therefrom) by being screwed with complementarily threaded fittings, the user must rotate a heavy and bulky conduit in potentially tight spots. Because the threaded compression ring 500 of this invention allows the compression ring 500 to bite down into the conduit 800 to secure the conduit 800 to the connector assembly 100, it is not necessary to rotate large conduits 800 to screw them into fittings in order to secure them in the field.

FIG. 8 shows an exemplary connector assembly 100 incorporating a repair coupling connector 700, and the cross-sections of FIGS. 9A and 9B show this configuration facilitates the coupling of two conduits 800, allowing the conduits 800 to come in close proximity to each other (here, flush with each other). It is noted that additional conduits 800 can be secured to the connector assembly 100 using additional repair coupling connectors 700, compression nuts 600, and compression rings 500. To replace a damaged conduit 800 from a connector assembly 100 including, for example, three or more conduits 800 secured by two or more sets of repair coupling connectors 700, compression nuts 600, and compression rings 500, a user can begin by unscrewing the repair coupling connectors 700 at opposing ends of the damaged conduit 800 until the connectors 700 are no longer screwed into their corresponding compression nuts 600. A connector nipple 725 allows the user to conveniently grip and turn the connector 700 (see also FIG. 6). It is noted that as the connector first axial end 705 is retracted from the compression nut second axial end 610, the compression ring 500 expands, releasing its grip on the conduit 800, and allowing the conduit 800 to be removed from the connector assembly 100. A replacement conduit 800 can be secured to the connector assembly 100 by positioning the conduit 800 next to surrounding (undamaged) conduits 800, and re-tightening the repair coupling connectors 700 at opposing ends of the conduit 800. The resulting compression of the compression ring 500 bites into the replacement conduit 800 using the serrated compression ring teeth 515 (if unthreaded), or mates with the conduit's 800 threading (if threaded), securing the replacement conduit 800 to the connector assembly 100.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

The invention claimed is:

1. A connector assembly including a conduit and a compression ring,
   a) the conduit having a conduit inner surface opposing a conduit outer surface, at least a portion of the conduit outer surface being threaded; and
   b) the compression ring:
      1) extending:
         (i) from a first circumferential end to a second circumferential end, wherein the first circumferential end is complementarily interfittable with the second circumferential end; and
         (ii) from a compression ring first axial end to a compression ring second axial end; and
      2) having:
         (i) a circumferential gap between the first circumferential end and the second circumferential end, wherein the circumferential gap spaces the first circumferential end from the second circumferential end;
         (ii) a compression ring outer surface opposing a compression ring inner surface; and
         (iii) a set of teeth extending radially inwardly from the compression ring inner surface;
   c) wherein:
      1) the compression ring is configured to be compressable when installed in the connector assembly such that the first circumferential end is brought toward the second circumferential end; and
      2) the set of teeth of the compression ring is configured to complementarily engage the portion of the conduit outer surface that is threaded.

2. The connector assembly of claim 1 wherein at least one of the compression ring first axial end and the compression ring second axial end is chamfered.

3. The connector assembly of claim 1 wherein one or more teeth in the set of teeth extends circumferentially from at least substantially the first circumferential end to at least substantially the second circumferential end.

4. The connector assembly of claim 1 wherein:
   a) each tooth in the set of teeth includes a tooth first side opposing a tooth second side; and
   b) the tooth first side:
      1) faces the compression ring first axial end; and
      2) makes a first side angle with the compression ring inner surface, the first side angle ranging from at least substantially 45 degrees to at least substantially 135 degrees.

5. The connector assembly of claim 4 wherein each tooth terminates in an at least substantially sharp point.

6. The connector assembly of claim 4 wherein the first side angle is at least substantially 90 degrees.

7. The connector assembly of claim 6 further including a conduit extending through the compression ring, wherein the tooth first side faces away from a direction in which the conduit may be pulled out of the connector assembly.

8. The connector assembly of claim 6 wherein the tooth second side:
   a) faces the compression ring second axial end; and
   b) makes a second side angle with the compression ring inner surface, the second side angle being substantially less than 90 degrees.

9. The connector assembly of claim 1 wherein:
   a) the compression ring includes a central longitudinal axis extending in a direction that is at least substantially perpendicular to a bisecting plane, the bisecting plane axially bisecting the compression ring between the compression ring first axial end and the compression ring second axial end;
   b) each tooth in the set of teeth includes a tooth first side opposing a tooth second side,
      1) the tooth first side facing the compressing ring first axial end, and
      2) the tooth second side facing the compressing ring second axial end; and c) the first side angle is at least substantially perpendicular to a central longitudinal axis of the compression ring, the central longitudinal axis being at least substantially perpendicular to the bisecting plane.

10. The connector assembly of claim 1 further including a conduit, wherein:
   a) the conduit includes a conduit inner surface opposing a conduit outer surface;
   b) at least a portion of the conduit outer surface is at least substantially smooth; and
   c) the set of teeth of the compression ring includes sharp teeth configured to engage the portion of the conduit outer surface that is smooth to secure the compression ring to the conduit.

11. The connector assembly of claim 1
   a) further including:
      1) a compression nut;
      2) a connector; and
      3) a conduit;
   b) wherein:
      1) the compression nut includes a compression nut first axial end having a first passage diameter, and a compression nut second axial end having a second passage diameter, the first passage diameter being smaller than the second passage diameter;
      2) the connector includes a connector first axial end and a connector second axial end, the connector first axial end having a connector chamfer; and
      3) the connector assembly is configured to compress the compression ring when the compression ring is sandwiched between the connector chamfer and the compression nut first axial end.

12. The connector assembly of claim 11 further including an internal sealing gasket positioned within the connector first axial end, wherein the internal sealing gasket is configured seal from moisture.

13. The connector assembly of claim 11 wherein the connector is configured such that the connector second axial end is securable to at least one component selected from the group including:
   a) an electrical junction box; and
   b) a second conduit.

14. The connector assembly of claim 11 further including a second conduit, wherein the connector assembly is configured to be securable to the conduit and the second conduit, with the second conduit abutting the conduit when both are installed in the connector assembly.

15. A connector assembly including:
   a) a compression ring:
      1) extending:
         (i) from a first circumferential end to a second circumferential end, wherein the first circumferential end is complementarily interfittable with the second circumferential end; and
         (ii) from a compression ring first axial end to a compression ring second axial end; and
      2) having:
         (i) a circumferential gap between the first circumferential end and the second circumferential end, wherein the circumferential gap spaces the first circumferential end from the second circumferential end;
         (ii) a compression ring outer surface opposing a compression ring inner surface; and
         (iii) a set of teeth extending radially inwardly from the compression ring inner surface;
   b) a compression nut;
   c) a connector;
   d) a conduit; and
   e) an external sealing gasket;
   wherein:
      I. the compression ring is configured to be compressable when installed in the connector assembly such that the first circumferential end is brought toward the second circumferential end;
      II. the compression nut includes a compression nut first axial end having a first passage diameter, and a compression nut second axial end having a second passage diameter, the first passage diameter being smaller than the second passage diameter;
      III. the connector includes a connector first axial end and a connector second axial end, the connector first axial end having a connector chamfer; and
      IV. the connector assembly is configured to compress the compression ring when the compression ring is sandwiched between the connector chamfer and the compression nut first axial end;
      V. the external sealing gasket is positioned about the connector second axial end; and
      VI. the external sealing gasket is configured to seal from moisture.

16. A connector assembly including:
   a) a compression ring:
      1) extending:
         (i) from a first circumferential end to a second circumferential end, wherein the first circumferential end is complementarily interfittable with the second circumferential end; and
         (ii) from a compression ring first axial end to a compression ring second axial end; and
      2) having:
         (i) a circumferential gap between the first circumferential end and the second circumferential end, wherein the circumferential gap spaces the first circumferential end from the second circumferential end;
         (ii) a compression ring outer surface opposing a compression ring inner surface; and
         (iii) a set of teeth extending radially inwardly from the compression ring inner surface;
   b) a compression nut;
   c) a connector; and
   d) a conduit;
   wherein:
      I. the compression ring is configured to be compressable when installed in the connector assembly such that the first circumferential end is brought toward the second circumferential end;
      II. the compression nut includes a compression nut first axial end having a first passage diameter, and a compression nut second axial end having a second passage diameter, the first passage diameter being smaller than the second passage diameter;
      III. the connector includes a connector first axial end and a connector second axial end, the connector first axial end having a connector chamfer; and
      IV. the connector assembly is configured to compress the compression ring when the compression ring is sandwiched between the connector chamfer and the compression nut first axial end;
      V. the connector first axial end includes a connector first end outer surface opposing a connector first end inner surface, with at least a portion of the connector first end outer surface being threaded;

VI. the compression nut first axial end is chamfered to complementarily engage the compression ring first axial end;
VII. the compression nut second axial end:
A. is sized to receive the compression ring and the conduit therein;
B. includes a compression nut second end outer surface opposing a compression nut second end inner surface, with at least a portion of the compression nut second end inner surface being threaded;
VIII. the conduit includes a conduit inner surface opposing a conduit outer surface; and
IX. the conduit is securable to the connector assembly by having:
A. the connector first end outer surface threading complementarily engage the compression nut second end inner surface threading;
B. the compression ring sandwiched between the compression nut first axial end and the connector first axial end to compress the compression ring; and
C. the set of teeth of the compression ring engage at least a portion of the conduit outer surface.

17. A connector assembly including:
a) a compression ring having:
1) a first circumferential end and a second circumferential end, wherein the first circumferential end is complementarily interfittable with the second circumferential end; and
2) a circumferential gap between the first circumferential end and the second circumferential end, wherein the circumferential gap:
(i) spaces the first circumferential end from the second circumferential end; and
(ii) is configured to make the compression ring compressible as the first circumferential end is brought closer to the second circumferential end;
3) a compression ring outer surface opposing a compression ring inner surface; and
4) threading extending radially inwardly from the compression ring inner surface; and
b) a conduit having a conduit outer surface opposing a conduit inner surface, wherein:
1) the conduit is sized to fit through the compression ring;
2) the compression ring is configured to be securable to the conduit by having the compression ring threading engage the conduit outer surface;
c) a compression nut having a compression nut first axial end and a compression nut second axial end, wherein:
1) the compression nut first axial end has a narrower passage than the compression nut second axial end; and
2) the compression nut second axial end is sized to receive the conduit therethrough;
d) a connector having a connector first axial end and a connector second axial end, wherein:
1) the connector first axial end includes a connector chamfer; and
2) the compression ring is compressable when the compression ring is squeezed between the connector chamfer and the compression nut first axial end; and
e) an internal sealing gasket and an external sealing gasket, wherein:
1) the internal sealing gasket is positioned within the connector first axial end;
2) the external sealing gasket is positioned about the connector second axial end; and
3) the internal and external sealing gaskets are configured to seal the connector assembly from moisture.

18. The connector assembly of claim 17 wherein the compression ring threading includes one or more teeth extending circumferentially from at least substantially the first circumferential end to at least substantially the second circumferential end.

19. The connector assembly of claim 18 wherein:
a) the compression ring includes a compression ring first axial end and an opposing compression ring second axial end; and
b) at least one of the compression ring first axial end and the compression ring second axial end includes a compression ring chamfer.

20. The connector assembly of claim 17 wherein:
a) the teeth of the compression ring include a tooth first side opposing a tooth second side,
1) the tooth first side facing the compression ring first axial end,
2) the tooth second side facing the compression ring second axial end;
b) the tooth first side makes an angle between at least substantially 75 degrees and at least substantially 105 degrees.

21. A connector assembly including:
a) a compression ring which is at least substantially cylindrical, the compression ring having:
1) a compression ring outer surface opposing a compression ring inner surface;
2) a compression ring first axial end opposing a compression ring second axial end, wherein the compression ring second axial end is chamfered;
3) one or more teeth extending radially inwardly from the compression ring inner surface, wherein each tooth:
(i) circumferentially extends along at least a substantial portion of the compression ring inner surface; and
(ii) includes a tooth first side facing the compression ring first axial end, and a tooth second side facing the compression ring second axial end;
b) a connector having a connector first axial end opposing a connector second axial end, the connector first axial end terminating in a connector chamfer;
c) a compression nut having a compression nut first axial end opposing a compression nut second axial end, wherein:
1) the compression nut first axial end has a first passage diameter and the compression nut second axial end has a second passage diameter,
(i) the first passage diameter being smaller than the second passage diameter;
(ii) the second passage diameter being sized to allow the compression nut second axial end to receive the compression ring and the connector first axial end therein; and
2) when the compression ring is positioned within the compression nut second axial end and the connector first axial end is inserted into the compression nut second axial end, the compression ring is compressed as the compression ring is squeezed between the connector chamfer and the compression nut first axial end; and
d) a conduit, wherein:

1) the conduit includes a conduit inner surface opposing a conduit outer surface;
2) at least a portion of the conduit outer surface is threaded; and
3) the one or more teeth of the compression ring are configured to complementarily engage the portion of the conduit outer surface that is threaded.

22. The connector assembly of claim 21 further including a conduit inserted through the compression nut, the conduit having a conduit outer surface opposing a conduit inner surface, wherein:
   a) the one or more teeth of the compression ring terminate in sharp points;
   b) the tooth second side of each of the one or more teeth is at least substantially perpendicular to the compression ring inner surface; and
   c) the tooth second side faces away from a direction in which the conduit may be pulled out from the connector assembly so that the compression ring resists pullout of the conduit when the one or more teeth of the compression ring contact the conduit outer surface.

\* \* \* \* \*